US005440872A

United States Patent [19]
Pfefferle

[11] Patent Number: 5,440,872
[45] Date of Patent: Aug. 15, 1995

[54] CATALYTIC METHOD

[76] Inventor: William C. Pfefferle, 51 Woodland Dr., Middletown, N.J. 07748

[21] Appl. No.: 304,137

[22] Filed: Sep. 12, 1994

Related U.S. Application Data

[60] Continuation-in-part of Ser. No. 245,429, May 18, 1994, which is a continuation-in-part of Ser. No. 661,386, Feb. 26, 1991, Pat. No. 5,342,591, which is a division of Ser. No. 273,343, Nov. 18, 1988, Pat. No. 5,051,241.

[51] Int. Cl.$^6$ ................................................ F23R 3/40
[52] U.S. Cl. ........................................ 60/39.06; 60/39.02; 60/39.12; 60/723; 502/439; 423/213.2; 422/180
[58] Field of Search ................. 60/39.02, 723, 39.06; 502/439; 204/192.1

[56] References Cited

U.S. PATENT DOCUMENTS

| | | | |
|---|---|---|---|
| 3,885,539 | 5/1975 | Hicks | 123/119 |
| 4,285,193 | 8/1981 | Shaw et al. | 60/39.06 |
| 4,893,465 | 1/1990 | Farrauto et al. | 60/39.02 |
| 5,051,241 | 9/1991 | Pfefferle | 422/180 |
| 5,214,912 | 6/1993 | Farrauto et al. | 60/39.06 |
| 5,216,875 | 6/1993 | Kennelly et al. | 423/213.5 |
| 5,246,672 | 9/1993 | Bak | 502/439 |
| 5,306,470 | 4/1994 | Bak et al. | 422/174 |
| 5,342,591 | 8/1994 | Pfefferle | 423/213.2 |
| 5,355,668 | 10/1994 | Weil et al. | 60/39.06 |

*Primary Examiner*—Anthony McFarlane
*Attorney, Agent, or Firm*—Kane, Dalsimer, Sullivan, Kurucz, Levy, Eisele and Richard

[57] ABSTRACT

A low emissions combustor for use in gas turbines which operate at turbine inlet temperatures below about 1250 degrees Kelvin, which comprises;
  a multiplicity of microlith catalyst elements; and
  means for providing an admixture of fuel and air having an adiabatic flame temperature within the range of 600 to 1250 degrees Kelvin.

12 Claims, 1 Drawing Sheet

CATALYTIC METHOD

CROSS-REFERENCE TO RELATED APPLICATIONS

This application is a Continuation-In-Part of my U.S. application Ser. No. 08/245,429 filed May 18, 1994 which was a Continuation-In-Part of U.S. application Ser. No. 07/661,386 filed Feb. 26, 1991 and issued as U.S. Pat. No. 5,342,591 and which was a division of U.S. application Ser. No. 07/273,343 filed Nov. 18, 1988 and issued as U.S. Pat. No. 5,051,241.

BACKGROUND OF THE INVENTION

1. Field of the Invention

This invention relates to improved catalytic reaction systems and to use in gas turbines.

2. Brief Description of Related Art

Automotive emissions are a major environmental problem in spite of the advances brought about by the use of catalytic converters. One factor limiting the performance of catalytic converters is that pollution is not controlled during the thirty or so seconds required to bring the converter catalyst to its operating temperature. In present converters, warm-up is dependent on heating of the catalyst by hot engine exhaust gases. Although electrical heating could be utilized to preheat the catalyst prior to engine operation, the power and the time delay required with present catalyst structures, ceramic or metal, have been deemed unacceptable.

Subsequent to catalyst light-off, surface reactions on conventional monolithic catalysts such as are used in catalytic converters are mass transfer limited. Thus, the catalyst mass required for a given conversion level is much higher than if no mass transfer limitation existed at the given operating conditions. The high catalyst mass required for the required conversion level results in the relatively long heat-up times experienced, even with electrical heating. In addition, this mass transfer limitation is such that the conversion level of present automotive exhaust catalytic converters is limited to relatively low levels, typically not more than about 95%, even with the relatively small catalyst channel sizes employed. Higher conversion levels would be advantageous.

The need to reduce catalyst warm-up time of the conventional ceramic monolith automotive catalysts to reduce emissions during the warm-up period has led to increased interest in metal monolith catalysts. However, merely substituting metal for ceramic in a conventional monolith structure yields catalysts which still have much too high a thermal mass. Although metal monoliths are electrically conductive and could therefore be electrically preheated, fast enough heat up times have not yet been demonstrated as feasible. Furthermore, thermal shock damage would likely be a problem if a conventional metal monolith were heated as rapidly as needed for elimination of start-up emissions. There is a critical need for a catalyst system which can control hydrocarbon emissions during initial engine operation.

For catalytic combustors the problem is not just emissions but the ability to function in certain applications. For example, an automotive catalytic combustor gas turbine must start in roughly the same time frame as present automotive engines.

The present invention provides catalysts and systems which make possible much more rapid warm-up of converter catalysts without electrical heating and near instantaneous electrical heating of catalysts in combustors and catalytic converters. Moreover, catalysts of the present invention enable much higher conversions and improved selectivity in many chemical conversion processes by virtue of improved mass transfer to and from the catalyst surface. The process of the invention provides catalyst articles of improved durability, efficiency and service life.

SUMMARY OF THE INVENTION

Definition of Terms

In the present invention the terms "monolith" and "monolith catalyst" refer not only to conventional monolithic structures and catalysts such as employed in conventional catalytic converters but also to any equivalent unitary structure such as an assembly or roll of interlocking sheets or the like but, as appreciated in the art, does not include particulates, such as powders or pellets.

For the purposes of this invention, the terms "microlith" and "microlith catalyst" refer to high open area monolith catalyst elements with flow paths so short that reaction rate per unit length per channel is at least fifty percent higher than for the same diameter channel with a fully developed boundary layer in laminar flow, i.e. a flow path of less than about four mm in length, preferably less than one mm or even less than 0.5 mm and having flow channels with a ratio of channel flow length to channel diameter less than about five to one, but preferably less than two to one and more preferably less than about 0.5 to one. Channel diameter is defined as the diameter of the largest circle which will fit within the given flow channel and is preferably less than one mm or more preferably less than 0.5 mm. Microlith catalysts may be in the form of woven wire screens, pressed metal or wire screens and have as many as 100 to 1000 or, more flow channels per square centimeter. Flow channels may be of any desired shape. For wire screens, flow channel length is the wire diameter and thus advantageously may be shorter than 0.3 mm or even shorter than 0.1 mm.

The terms "carbonaceous compound" and "hydrocarbon" as used in the present invention refer to organic compounds and to gas streams containing fuel values in the form of compounds such as carbon monoxide, organic compounds or partial oxidation products of carbon containing compounds.

The Invention

It has now been found that use of the microlith catalysts of the present invention makes possible as much as a ten fold or more reduction in catalyst mass as compared to that required to achieve the same conversion in mass transfer limited reactions of hydrocarbons using conventional monoliths. It has been found that the specific mass transfer rate increases as the ratio of channel length to channel diameter of a monolith catalyst is reduced below about five to one or more preferably below about two to one and especially below about one to one. Mass transfer of reactants to the surface becomes sensitive to the inlet flow rate rather than being significantly limited by the diffusion rate through a thick laminar flow boundary layer as in conventional monolith catalysts. In such conventional automotive monolith catalysts, the amount of pollutants oxidized is essentially independent of exhaust gas flow rate and thus percent conversion decreases with increase in flow rate. In contrast, in the microlith catalysts of the present invention, the amount of reactants oxidized typically increases with increase in flow rate. Thus if the inlet flow velocity is high enough, the reaction rate can even approach the intrinsic kinetic reaction rate at the given catalyst temperature without imposing an intolerable pressure drop. This means that it is practical to design microlith fume abatement reactors for much higher conversion levels than is feasible with conventional catalytic converters. Conversion levels of 99.9% or even higher are achievable in a microlith automotive converter smaller insize than a lower conversion level conventional catalytic converter. Conversion levels high enough for abatement of toxic fumes are achievable in compact reactors.

With the short flow paths of catalysts of the present invention, pressure drop is low permitting the use of much smaller channel diameters for a given pressure drop, further reducing catalyst mass required. It has also been found that channel walls as thin as 0.1 mm or even less than 0.03 mm are practical with small channel diameters thus permitting high open areas even with such small channel diameters. Thus, as many as several thousand flow channels per square centimeter or even more are feasible without reducing open area in the direction of flow below sixty percent. Open areas greater than 65, 70 or even 80 percent are feasible even with high channel density microliths.

This combination of low pressure drop, conversion efficiency high enough even for fume abatement, and compact size makes possible an essentially zero $NO_x$ surface reaction combustor for gas turbines which operate with turbine inlet temperatures below 1250 degrees Kelvin. Containing a multiplicity of microlith catalyst elements, from as few as thirty to as many as two or three hundred, such a microlith combustor makes possible efficient, low emissions automotive gas turbines.

Inasmuch as heat transfer and mass transfer are functionally related, an increase in mass transfer results in a corresponding increase in heat transfer. Thus, not only is catalyst mass reduced by use of the microlith catalysts of this invention, but the rate at which an automotive exhaust catalyst is heated by the hot engine exhaust is correspondingly enhanced.

The reduced catalyst mass together with the increased heat transfer rate enables a microlith catalyst of the invention to reach operating temperature much sooner than would a conventional automotive catalyst. If placed sufficiently close to the engine exhaust manifold, a microlith catalyst element can even reach operating temperature in less than five seconds without electrical heating. Effective operating temperature for automotive exhaust microlith precious metal catalysts are as low as 650 or even as low as 550 degrees Kelvin. However, an important feature of microlith catalysts of the invention is that high enough operating temperatures are achievable prior to or during engine cranking to permit effective use of base metal catalysts. It has been found that a metal microlith composed of a high temperature alloy containing a base metal catalytic element such as chromium, cobalt, copper, manganese, nickel or a rare earth metal is catalytically active if heated to a temperature of about 800 degrees Kelvin, a temperature readily achieved in less than one second with electrical heating. Many such alloys are commercially available and include Haynes alloy 25, Inconel 600, and even certain stainless steels. With metal microliths, alloy selection is often determined primarily by oxidation resistance at the maximum operating temperature required by the given application.

The mass of microlith catalyst elements of the invention can be so low that it is feasible to electrically preheat the catalyst to an effective operating temperature in less than about 0.50 seconds if a thin channel wall electrically conductive catalyst, e.g., a metal microlith, is used. In catalytic combustor applications the low thermal mass of catalyst elements of the present invention makes it possible to bring a combustor catalyst up to a light-off temperature as high as 1000 or even 1500 degrees Kelvin in less than about five seconds by electrical heating and even in less than about one or two seconds using the power from a conventional automotive battery. Such rapid heating is allowable for microlith catalysts of the invention because sufficiently short flow paths permit rapid heating without the consequent thermal expansion resulting in destructive stress levels.

Typically, in automotive exhaust systems of the present invention the catalyst elements preferably have flow paths of less than about one millimeter in length and may be less than about 0.1 millimeter in length with as little five high channel density elements required to greatly exceed the start-up performance of a 150 millimeter long conventional monolith. The short channels exhibit a low pressure drop even with channels as small as 0.25 millimeters in diameter. However, if particulates are present channel size must be large enough to avoid plugging. In catalytic combustor applications, where unvaporized fuel droplets may be present, flow channel diameter is often large enough to allow unrestricted passage of the largest expected fuel droplet. Therefore in catalytic combustor applications flow channels may be as large as 1.0 millimeters in diameter whereas in automotive catalytic converter applications, flow channel diameter often can be as small as 0.5 to 0.25 millimeters or even smaller. If desired, one, two or three microlith catalyst elements of the invention may be placed in front of a conventional monolith catalyst element to serve as a light-off reactor for the monolith. This approach is useful for retrofit applications.

Although as few as one or two catalyst elements advantageously may be used in a given catalytic converter application to improve the cold start performance of conventional monolith catalysts, the low pressure drops passible with catalysts of the present invention makes it possible to utilize a large number of small diameter elements, even as many as two hundred in a one inch length, such that the converter diameter is not significantly larger than the engine exhaust pipe. This makes it much easier to place the converter catalyst at the exit of or even in the engine exhaust manifold, resulting in even faster catalyst warm up without electrical heating, and allows use of screens of different composition to achieve both hydrocarbon and NOx control. In other fume abatement applications, the large number elements feasible means that it is practical to achieve whatever conversion levels are needed, even as high as 99.999 percent or better.

Although this invention has been described primarily in terms of automotive emissions control, the high mass transfer rates of microlith catalysts of the invention offers higher conversions and improved selectivity in many catalytic conversion processes. In particular, microlith catalysts of the invention offer superior performance in highly exothermic reactions such as the conversion of methane and other hydrocarbons to partially oxidized species; for example, the conversion of methane to methanol or the conversion of ethane to ethylene.

The catalyst preparation method of the present invention is especially useful for preparing microlith catalysts in that it enables the use of an unlimited variety of catalyst formulations which would be difficult or even impossible to produce using conventional chemical deposition procedures. Although direct chemical coating of microlith catalysts from aqueous or organic solutions can be employed to produce useful catalysts, the method of the present invention makes possible catalysts of improved durability and service life. In addition, as will be appreciated by those skilled in the art, it is generally disadvantageous in applications requiring a high open area catalyst to employ the conventionally used slip-coating methods to produce commercial automotive exhaust catalysts. Slipcoating techniques result in coating thicknesses typically on the order of 0.02 millimeter or more, i.e., enough to significantly reduce the open area of a small channel microlith. Thus it is disadvantageous to use a slip or gel coated Substrate such as described U.S. Pat. No. 3,957,692, or sputter coat particulates which are then applied by slip coating (such as the method of U.S. Pat. No. 3,966,645). Not only are such slip coats relatively thick but adhesion to a substate depends on penetration of surface porosity.

In contrast, coatings of almost any thickness down to as little as fifty angstom units or even less in thickness can be obtained by the method of the present invention, but more preferrably at least about 75 angstrom to about one or two microns in thickness. Advantageously these coatings are impact bonded to a metal surface, i.e.; the initial atoms penetrate the surface layer, and thus even a refractory metal oxide coating resists delamination from a metal substrate under conditions of use. In addition, because nonporous layers of ten or more monolayers may be deposited, a refractory metal oxide layer thick enough to serve as a diffusion barrier between the metal substrate and a precious metal catalyst coating is obtained.

DETAILED DESCRIPTION OF PREFERRED EMBODIMENTS OF THE INVENTION

Figure 1:
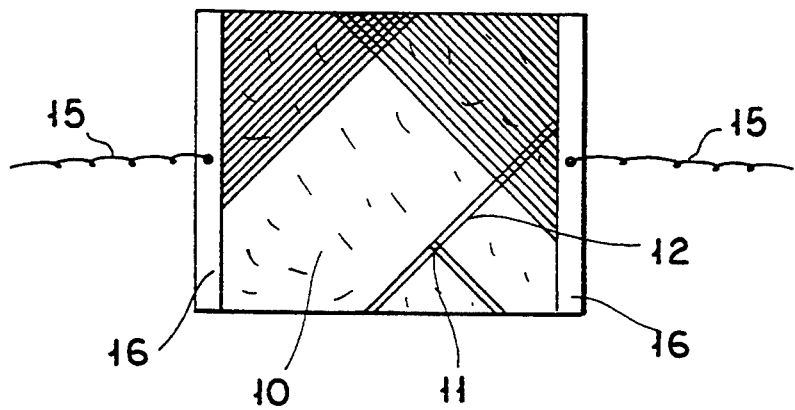
FIG. 1 shows an face view of an electrically conductive microlith catalyst element of the invention with electrical leads attached.

The present invention is further described in connection with the drawings. As shown in FIG. 1, in one preferred embodiment a microlith catalyst element 10 comprises a plurality of square flow channels 11 with electrical leads 15 connected to bus bars 16. Bus bars 16 are welded at a forty five degree angle to metallic flow channel walls 12 to ensure even heating of catalyst 10. Advantageously, catalyst element 10 is in the form of a catalytic metal screen of at least about 400 flow channels per square centimeter with a wire diameter sufficiently small to yield an open area of at least about 70 percent. Using the power of a standard automotive battery the catalyst may be brought to an effective operating temperature in less than one second, often in significantly less than 0.50 seconds. Thus in automotive exhaust gas service, electrical power need not be applied till just after start of engine cranking thus limiting maximum drain on the battery. Advantageously, electrical power is applied prior to termination of engine cranking. Typically, an automotive microlith catalyst element is heated to an effective operating temperature within one to two seconds of start of engine cranking. This rapid heating is important in that no delay in engine starting is required to achieve emissions control. Typical reactors may have from one to ten or more such microliths.

Figure 2:
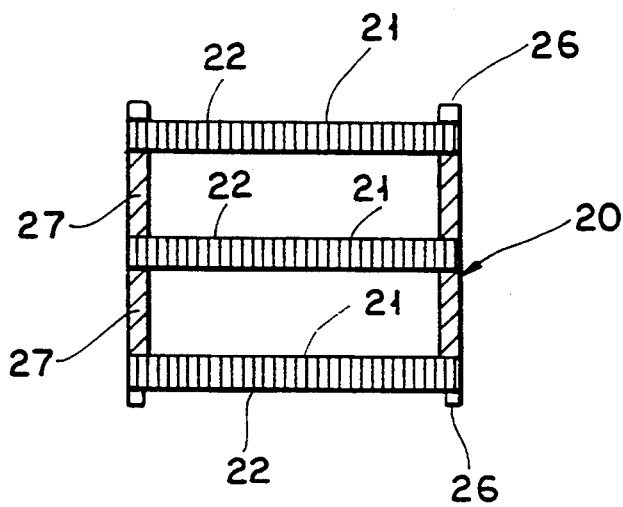
FIG. 2 shows a Cross sectional view of a three element microlith catalyst of the invention.

FIG. 2 shows a sectional view of a three element microlithic catalyst reactor 20 suitable for either automotive exhaust gas treatment or for catalytic combustor service. Microlith catalyst elements 21 having 400 flow channels per square centimeter are spaced apart a distance equal to or greater than the length of the flow paths 22 to provide for some mixing of gases flowing between elements 21. Catalyst elements 21 are held in reactor 20 by retaining rings 26 and separated from each other by spacers 27. A microlith catalyst reactor such as shown in FIG. 2, depending on the application, may contain any desired number of microlith elements. With fine wire microlith screens, as many as one hundred or more can readily be placed in a one inch long reactor.

The microlith catalysts of the present invention are readily made using known catalytic agents and conventional techniques of fabrication. The following examples describe means of making microlith catalysts but are not to be construed as limiting. A microlith catalyst as per FIG. 1 is made by vacuum sputtering platinum onto a stainless steel screen which has been cleaned by heating in air to 750 K. Typically the platinum coating may be thinner than 100 angstroms but may be thicker for greater catalyst life. Advantageously, a similarly thin layer of ceria or alumina may be deposited prior to deposition of the platinum. Catalysts containing palladium, iridium, rhodium or other metals can be similarly prepared. In many applications, especially with electrical heating, a wire screen formed from stainless steel or other alloy is a sufficiently active catalyst without additional coating.

In a preferred embodiment of the invention, catalyst articles of the invention are fabricated by sputtering admixtures of a precious metal catalyst and a base metal oxide on catalyst supports of metal, including the supports described above. Sputtering is a well known technique for bonding thin layers of metals to substrates. Representative of descriptions of sputtering are those found for example in U.S. Pat. Nos. 3,944,504 and 4,788,082, both of which are incorporated herein by reference thereto. The sputtering technique described in U.S. Pat. No. 4,046,712 (incorporated herein by reference thereto) is also applicable, but it should be borne in mind that the support elements described in this patent as coated are ceramic or carbon particulates. Metallic monolith catalysts pose significantly different adhesion problems than the inherently rough surfaced particulates. Even low porosity particulates present relatively large surface areas, as much as twenty square meters per gram. A 0.5 monoatomic layer on even a one square meter per gram surface represents a 0.5 square meter per gram catalyst surface, an area much greater than the geometric surface area of a metallic monolith. Thus with microlith catalysts it is important to fully utilize the available surface. This is not as necessary with particulate substitutes inasmuch as even a five atom precious metal film tends to agglomerate in use, such an extemely thinlayer on a microlith or even monolith catalyst would not provide a durable, long life catalyst article for the high temperature applications in which such catalysts are typically used. Much thicker coatings are required, typically at least about fifty or more atomic layers and for the highest temperature applications to stabilize the film by cosputtering of one or more base metal oxides into precious metal catalyst layer, advantageously by reactive sputtering of metal in the presence of oxygen. Depending on the intended use it is often advantageous to use a base metal oxide having catalytic properties. In addition, unlike ceramic and carbon substrates, metal supports require a barrier coat to prevent diffusion of a precious metal catalyst into the metal substrate in elevated temperature service. Although the inventor is not to be bound by any theory of operation, it is believed that the bond achieved by sputtering a catalyst coating on a metal support is more tenacious than those bonds obtained by, for example, slip coating. By sputtering, atoms of the metal being deposited are typically implanted below the surface of the metal support, instead of merely on top of the surface. In a preferred article of the invention, the substrate or support is first coated with a refractory base metal oxide by sputtering. Then the catalyst is sputtered directly on the interposed refractory base metal oxide, without any intervening slip-coat. According to the invention, a small proportion of a base metal oxide is admixed with the catalyst metal to be sputtered. The proportion of base metal oxide added may be within the range of from about 0.0001 to 10 weight percent, preferably 0.0001 to 5 weight percent. When the base support is a metal oxide or is first coated with abase metal oxide, the catalyst surface admixture bonds with a firmer adhesion. The technique of deposition by sputtering can be that described for example in U.S. Pat. No. 4,536,482 which is incorporated by reference thereto, except that the substrate is a metallic support for a monolithic catalyst such as a microlith instead of particles or pellets of refractory material.

The admixtures of a precious metal catalyst and a base metal oxide may be varied in scope. Precious metal catalysts are defined herein as gold, silver and the platinum group metals (metals of Group VIII of the periodic Table of Elements).

Representative of base metal oxides are oxides of the rare earth metals, such as cerium, zirconium, hafnium, thorium and the like. Alumina is also a useful base metal oxide. Catalytic oxides enhance catalyst activity.

The thickness of the sputtered layers are advantageously within the range of from about 5 microns to 100 mm.

Figure 3:
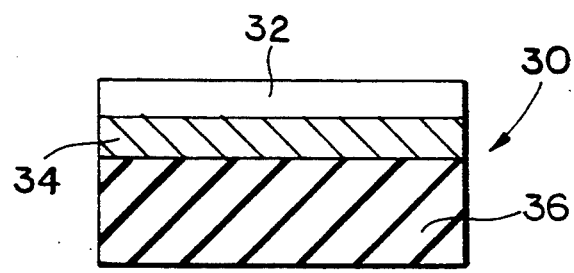
FIG. 3 shows a cross-sectional side view of an embodiment feature of the present invention.

Referring now to FIG. 3, there is seen in cross-sectional view an embodiment article 30 of the invention showing its structure. A catalytically active surface layer 32 comprises in admixture a precious metal catalyst with a refractory base metal oxide applied by sputtering onto layer 34 of a refractory base metal oxide. Layer 34 is also applied by sputtering onto catalyst support 36.

The following Examples describe the manner and the process for making and using the invention and set forth the best mode contemplated by the inventor for carrying out the invention.

EXAMPLE I

A three element catalytic microlith automotive exhaust reactor having about 2500 flow channels per square centimeter is constructed using a five centimeter wide strip of 70% open area screening of platinum coated stainless steel wires having a diameter of 0.03 mm spaced 0.20 mm apart and installed in the exhaust pipe of a four cylinder automotive engine. During engine cranking electrical power from the battery is applied heating the microlith catalyst elements to a temperature of 700 degrees Kelvin within one second whereby hydrocarbon emissions are controlled during initial operation of the engine.

EXAMPLE II

An electrically heated ten element microlith catalytic combustor is constructed using a screen fabricated with 0.076 mm wires of Kanthal. Ambient temperature air is passed through the reactor at a flow velocity greater than the laminar flame velocity of the fuel to be burned. The catalyst is then heated electrically to a temperature of 1000 degrees Kelvin and an intimate admixture of fuel and air is formed by spraying jet fuel into the air passing into the reactor. Plug flow combustion of the fuel is achieved.

EXAMPLE III

A fume abatement reactor six centimeters in length is constructed using 300 microlith elements of screening with about thirty 0.050 mm wires of platinum coated nichrome per centimeter (nominally 900 flow channels per square centimeter). Fumes containing 50 ppm by volume of benzene in air are preheated to 700 degrees Kelvin and passed through the microlith reactor. Better than 99.9 percent conversion of the benzene is achieved.

EXAMPLE IV

A combustor for an automotive gas turbine is constructed as per the reactor of Example III using platinum coated Hastelloy-X wires in place of nichrome wires. In operation, an admixture of gasoline and air having an adiabatic flame temperature between about 600 and 1200 degrees Kelvin is passed through the microlith combustor which operates at a reactor exit temperature essentially that of the adiabatic flame temperature. Fuel reacts on the catalytic surfaces to produce water and carbon dioxide with the liberation of heat. Exhaust emissions are below the level required for ultra-low emissions vehicles. For low emissions during initial operation the microlith catalyst is preheated to a temperature of at least about 600 degrees Kelvin before introduction of fuel, preferably by electrical heating. During normal operation the temperature of the inlet admixture is typically in the range of about 400 to 1000 degrees Kelvin.

I claim:

1. A low emissions combustor for use in gas turbines which operate at turbine inlet temperatures below about 1250 degrees Kelvin, which comprises;
    a multiplicity of microlith catalyst elements; and
    means for providing an admixture of fuel and air having an adiabatic flame temperature within the range of 600 to 1250 degrees Kelvin.

2. The combustor of claim 1 including means to preheat catalyst elements to a temperature effective to operate the catalyst element, prior to introduction of fuel.

3. The combustor of claim 2 wherein said preheating means allows preheating to a temperature of at least 600 degrees Kelvin.

4. The combustor of claim 2 wherein said combustor includes electrical preheating means.

5. The combustor of claim 1 wherein said fuel is a hydrocarbon.

6. The combustor of claim 5 wherein said fuel is gasoline.

7. The combustor of claim 1 wherein said catalyst elements comprise a precious metal coated on a microlith support structure.

8. The combustor of claim 7 wherein said precious metal coating is applied by sputtering.

9. The method of operating gas turbines which operate at turbine inlet temperatures below 1250 degrees Kelvin, which comprises;

providing an admixture of fuel and air having an adiabatic flame temperature between 600 and 1250 degrees Kelvin;

passing said admixture through a combustor comprising a multiplicity of microlith catalyst elements; and reacting said fuel on said catalyst elements to produce water and carbon dioxide with liberation of heat.

10. The method of claim 9 wherein said combustor is heated electrically to a temperature effective to operate the catalyst elements, prior to introduction of fuel.

11. The method of claim 9 wherein said fuel comprises a hydrocarbon.

12. The method of claim 10 wherein said fuel is gasoline.

* * * * *

UNITED STATES PATENT AND TRADEMARK OFFICE
CERTIFICATE OF CORRECTION

PATENT NO. : 5,440,872
DATED : August 15, 1995
INVENTOR(S) : William C. Pfefferle
CATALYTIC METHOD It is certified that error appears in the above-indentified patent and that said Letters Patent is hereby corrected as shown below:

Abstract and Columns, 2 thru 10;

In every instance where the word "microlith" appears in this patent, it should read -- Microlith  -- .

Signed and Sealed this

Thirtieth Day of July, 1996

Attest:

BRUCE LEHMAN

Attesting Officer

Commissioner of Patents and Trademarks